(12) United States Patent
Yasui

(10) Patent No.: US 10,845,644 B1
(45) Date of Patent: Nov. 24, 2020

(54) LIQUID CRYSTAL DISPLAY DEVICE

(71) Applicant: Panasonic Liquid Crystal Display Co., Ltd., Himeji (JP)

(72) Inventor: Yoichi Yasui, Osaka (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/750,789

(22) Filed: Jan. 23, 2020

(51) Int. Cl.
*G02F 1/13357* (2006.01)

(52) U.S. Cl.
CPC .... *G02F 1/133603* (2013.01); *G02F 2202/28* (2013.01)

(58) Field of Classification Search
CPC ................................................ G02F 1/133603
See application file for complete search history.

(56) References Cited

U.S. PATENT DOCUMENTS

| 2007/0133222 | A1 | 6/2007 | Watanabe et al. |
| 2019/0025498 | A1* | 1/2019 | Kaneki ............. G02F 1/133615 |

* cited by examiner

*Primary Examiner* — Thomas M Sember
(74) *Attorney, Agent, or Firm* — Hamre, Schumann, Mueller & Larson, P.C.

(57) ABSTRACT

A backlight for a display device and a display device including the backlight are disclosed. The backlight includes a light guide plate; a light emitting diode substrate; a frame member; and a plurality of adhesive materials spaced apart from each other. The light emitting diode substrate includes a substrate; and a plurality of light emitting diodes fixed to the substrate. The plurality of light emitting diodes are oriented to face a side surface of the light guide plate. A frame member is disposed facing a surface of the substrate that is opposite the plurality of light emitting diodes. In a side sectional view, the plurality of adhesive materials is spaced apart from each other along a length direction of the frame member. The length direction corresponds to a major dimension of the frame member.

17 Claims, 6 Drawing Sheets

LIQUID CRYSTAL DISPLAY DEVICE

FIELD

This disclosure relates generally to a liquid crystal display device. More specifically, this disclosure relates to a liquid crystal display device including a backlight, such as an edge type backlight and liquid crystal display device.

BACKGROUND

A liquid crystal display device is an electronic display that is widely used as a display for electronic devices such as, but not limited to, computers, televisions, cellular phones, and the like. An LCD device generally includes a thin film transistor (TFT) substrate and a color filter (CF) substrate. A liquid crystal layer is disposed between the TFT substrate and the CF substrate. The backlight unit can be an edge type or direct type backlight unit. In a direct type backlight unit, light emitted from light source element(s) (e.g., LEDs, lamp, etc.) proceeds directly to the one or more components. In an edge type backlight unit, light source elements are located along an edge or edges of a light guide that redirects the light emitted from the light source elements towards the one or more components that then filter the light to display the desired image.

SUMMARY

This disclosure relates generally to a liquid crystal display device. More specifically, this disclosure relates to a liquid crystal display device including a backlight, such as an edge type backlight and liquid crystal display device.

A backlight for a display device is disclosed. The backlight includes a light guide plate; a light emitting diode substrate; a frame member; and a plurality of adhesive materials spaced apart from each other. The light emitting diode substrate includes a substrate; and a plurality of light emitting diodes fixed to the substrate. The plurality of light emitting diodes is oriented to face a side surface of the light guide plate. A frame member is disposed facing a surface of the substrate that is opposite the plurality of light emitting diodes. In a side sectional view, the plurality of adhesive materials is spaced apart from each other along a length direction of the frame member. The length direction corresponds to a major dimension of the frame member.

A display device is also disclosed. The display device includes a liquid crystal display panel; and a backlight. The backlight includes a light guide plate; a light emitting diode substrate; a frame member; and a plurality of adhesive materials spaced apart from each other. The light emitting diode substrate includes a substrate; and a plurality of light emitting diodes fixed to the substrate. The plurality of light emitting diodes is oriented to face a side surface of the light guide plate. A frame member is disposed facing a surface of the substrate that is opposite the plurality of light emitting diodes. In a side sectional view, the plurality of adhesive materials is spaced apart from each other along a length direction of the frame member. The length direction corresponds to a major dimension of the frame member.

BRIEF DESCRIPTION OF THE DRAWINGS

References are made to the accompanying drawings that form a part of this disclosure, and which illustrate embodiments in which the systems and methods described in this Specification can be practiced.

Like reference numbers represent like parts throughout.

DETAILED DESCRIPTION

This disclosure relates generally to a liquid crystal display device. More specifically, this disclosure relates to a liquid crystal display device including a backlight, such as an edge type backlight and liquid crystal display device.

A liquid crystal display device is an electronic display that is widely used as a display for electronic devices such as, but not limited to, computers, televisions, cellular phones, and the like. An LCD device generally includes a thin film transistor (TFT) substrate and a color filter (CF) substrate. A liquid crystal layer is disposed between the TFT substrate and the CF substrate. The backlight unit can be an edge type or direct type backlight unit. In a direct type backlight unit, light emitted from light source element(s) (e.g., LEDs, lamp, etc.) proceeds directly to the one or more components. In an edge type backlight unit, light source elements are located along an edge or edges of a light guide that redirects the light emitted from the light source elements towards the one or more components that then filter the light to display the desired image.

The edge type backlight unit generally includes a frame member to which an LED substrate is securely attached. The LED substrate includes a substrate and a plurality of LEDs on the substrate. When the LEDs are enabled, heat is generated. As the LEDs heat the substrate, the substrate can deform. When the substrate deforms, a force can be applied to the frame since the LED substrate is fixed to the frame. As a result, the frame can be deformed and the display can be distorted as a result.

Embodiments of this disclosure are directed to securing the LED substrate to the frame in a manner in which the connection between the LED substrate and the frame is reduced in strength to a point that less deformation occurs when the LED substrate and the frame are heated. Thus the result can be an improved liquid crystal display device in which less deformation occurs.

Figure 1:
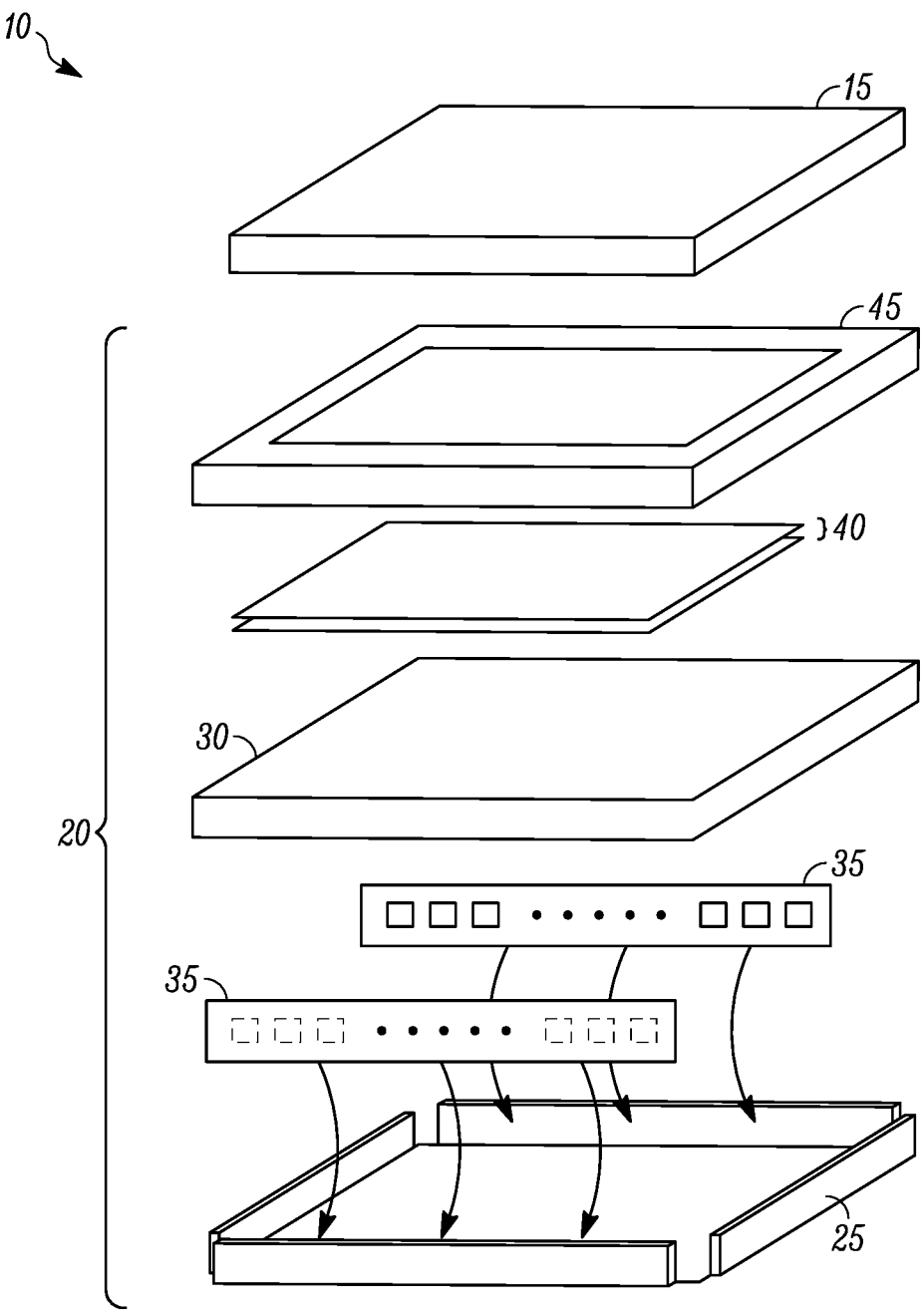
FIG. 1 is an exploded view of a liquid crystal display device, according to an embodiment.

FIG. 1 is an exploded view of a liquid crystal display device 10, according to an embodiment. The liquid crystal display device 10 includes a liquid crystal panel 15 and a backlight 20. It is to be appreciated that additional features can be present in the liquid crystal display device 10. Those components not specific to the present disclosure are omitted from this description for simplicity of the Specification.

The backlight 20 includes a frame member 25, sometimes alternatively referred to as the lower frame 25. The frame member 25 is generally made of metal. Suitable metals for the frame member 25 can include, but are not limited to, aluminum, stainless steel, steel, or the like. A light guide 30 is arranged to be held by the frame member 25. An LED substrate 35 includes a printed circuit board having LED light sources fixed thereto on one side surface of the light guide 30. Another surface of the LED substrate 35 (opposite the LED light sources) is secured to the frame member 25. The LED substrate 35 can be secured to the frame member via a pressure sensitive adhesive double-coated tape. Further details regarding the adhesive (not shown in FIG. 1) are described with reference to FIGS. 2-12 below. Optical sheets 40 (e.g., a prism sheet, a diffusion sheet, etc.) are arranged above the light guide 30. A frame member 45, sometimes alternatively referred to as the upper frame 45 is disposed between the liquid crystal panel 15 and the optical sheets 40.

Figure 2:
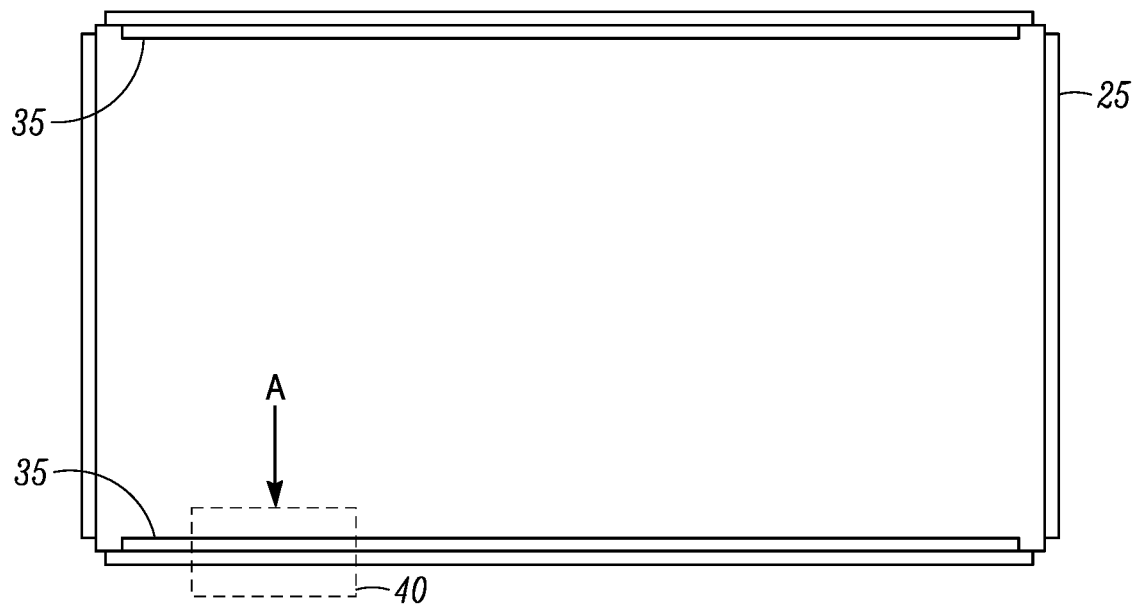
FIG. 2 is a top view of the frame member of the liquid crystal display device of FIG. 1, according to an embodiment.

FIG. 2 is a top view of the frame member 25 of the liquid crystal display device 10 of FIG. 1, according to an embodiment. In the illustrated embodiment, two LED substrates 35 are shown secured to the frame member 25. It is to be appreciated that the frame member 25 can include one or both LED substrates 35, according to an embodiment. For purposes of the remainder of this discussion, the LED substrate 35 including portion 40 will be discussed further. The other LED substrate 35 in the illustrated embodiment would correspond to the description as well, but that description will not be repeated for purposes of simplicity of this Specification.

Figure 3:
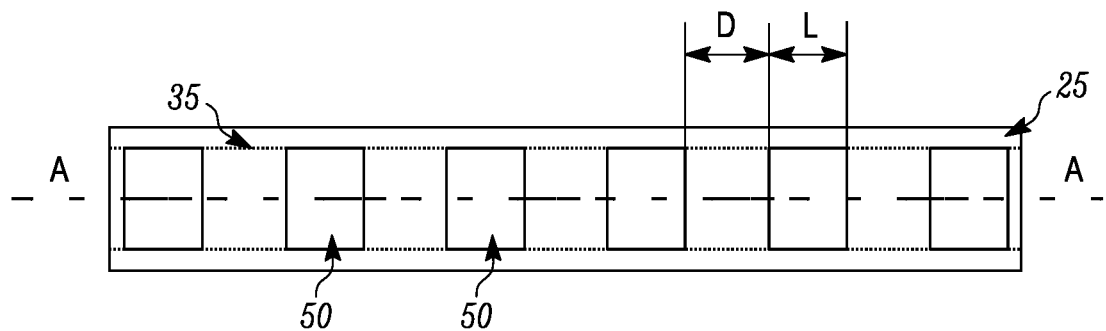
FIG. 3 is a view of the portion of the LED substrate in a direction of arrow A of the LED substrate of the liquid crystal display device, according to an embodiment.

FIG. 3 is a view of the portion 40 of the LED substrate 35 in a direction of arrow A of the LED substrate 35 of the liquid crystal display device 10, according to an embodiment. The direction A is generally representative of a thickness direction of the LED substrate 35.

In FIG. 3, the dashed lines are representative of the portion 40 of the LED substrate 35 on the frame member 25. Also shown is a plurality of adhesives 50. In the illustrated embodiment, each of the adhesives 50 is spaced from one another by a distance D in a length direction that corresponds to a major dimension of the frame member 25. The length direction runs along line A-A in the illustrated embodiment. The adhesives 50 have a length L. The length L of the adhesives 50 may generally be selected to be similar to or slightly larger than a lengthwise dimension of the individual LEDs that are present on the LED substrate 35. In an embodiment, a ratio L:D between the length of the adhesive and the distance between each adhesive 50 may be from at or about 1:1 to at or about 1:2. In an embodiment, a ratio of at or about 1:2 can be preferred in reducing an amount of deformation of the frame member 25 when the LED substrate 35 is heated. The length L of the adhesives 50 and the spacing D can be selected by balancing an amount of hold required to maintain the connection between the LED substrate 35 and the frame member 25 and reducing an amount of deformation (by reducing an overall surface area of the adhesives 50 that is in contact with the frame member 25).

Figure 4:
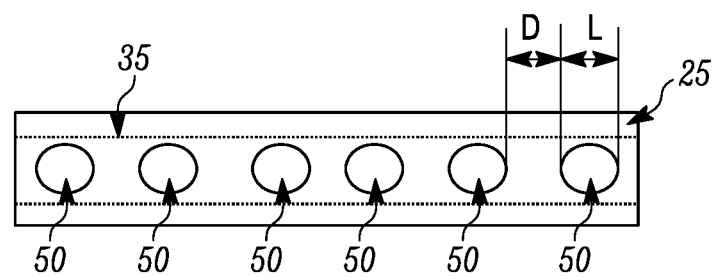
FIG. 4 shows a view of the portion of the LED substrate of the liquid crystal display device including elliptically-shaped adhesives, according to an embodiment.

In the illustrated embodiment, the adhesives 50 have a generally rectangular geometry. Here, "generally rectangular" means rectangular subject to manufacturing tolerances or the like. It is to be appreciated that the geometry can be other than rectangular. For example, FIG. 4 shows a view in the direction of arrow A of the portion 40 of the LED substrate 35 of the liquid crystal display device 10 including elliptically-shaped adhesives 50, according to another embodiment. It is to be appreciated that the adhesive geometry can alternatively include square or circular as well.

Figure 5:
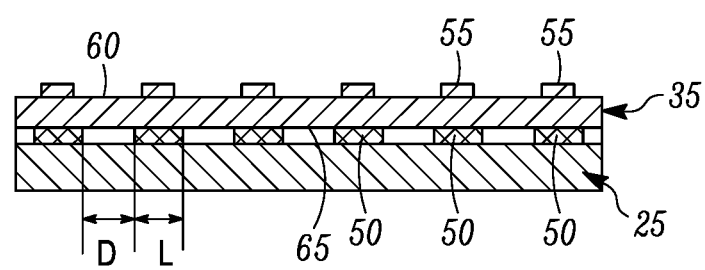
FIG. 5 is a cross-sectional view along line A-A of the frame member and the LED substrate of FIG. 3, according to an embodiment.

FIG. 5 is a cross-sectional view along line A-A of the frame member 25 and the LED substrate 35 of FIG. 3, according to an embodiment. The LED substrate 35 includes a plurality of LEDs 55 disposed on a surface 60 of the LED substrate 35. The adhesives 50 are secured to the frame member 25 and the LED substrate 35 on a surface 65 of the LED substrate 35 that is opposite the surface 60. As can be seen in the illustrated embodiment, when viewed in a side sectional view, the plurality of adhesives 50 are spaced apart from each other along a length direction of the frame member 25 that corresponds to a major dimension of the frame member 25.

Figure 6:
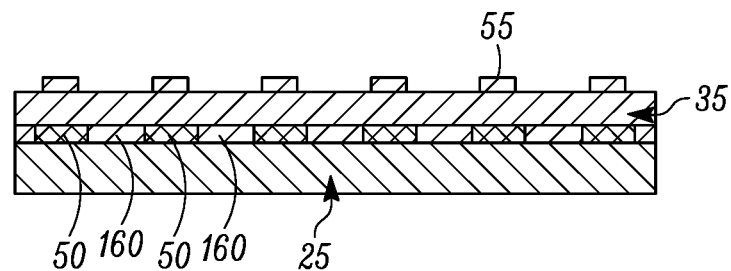
FIG. 6 is a cross-sectional view along line A-A of the portion of the frame member and the LED substrate of FIG. 3, according to another embodiment.

FIG. 6 is a cross-sectional view along line A-A of the portion 40 of the frame member 25 and LED substrate 35 of FIG. 3, according to another embodiment.

The embodiment illustrated in FIG. 6 generally is similar to the embodiment shown in FIG. 4. In FIG. 6, a plurality of thermally conductive materials 160 are added between the plurality of adhesives 50. The thermally conductive materials 160 can have a thermal conductivity that is relatively larger than a thermal conductivity of the adhesives 50. In this embodiment, the thermally conductive materials 160 have no or less adhesive strength than the adhesives 50.

In an embodiment, the thermal conductivity of the thermally conductive materials 160 is greater than a thermal conductivity of air. In an example, the thermally conductive materials can be grease, a gel, a metal block, suitable combinations thereof, or the like. The thermally conductive materials 160 can generally be in contact with the LED substrate 35 and with the frame member 25. The thermally conductive materials 160 are generally not securely fixed to the LED substrate 35 or the frame member 25. It is to be appreciated that the thermally conductive materials 160 could alternatively be secured to the LED substrate 35, the frame member 25, or both of the LED substrate 35 and the frame member 25.

Figure 7:
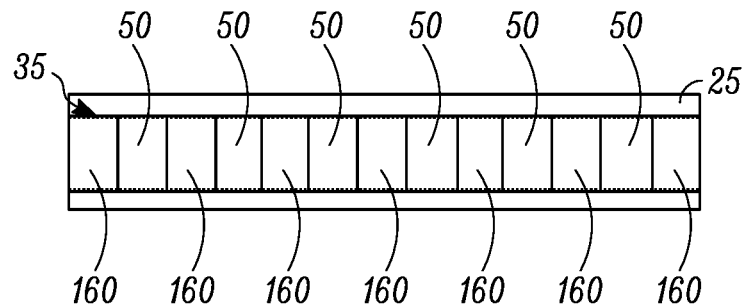
FIG. 7 is a top view of the frame member of the liquid crystal display device of FIG. 1, according to the embodiment in FIG. 6.

FIG. 7 is a top view of the frame member 25 of the liquid crystal display device 10 of FIG. 1, according to the embodiment in FIG. 6. As shown, the thermally conductive materials 160 and the adhesives 50 are arranged in an alternating fashion.

Figure 8:
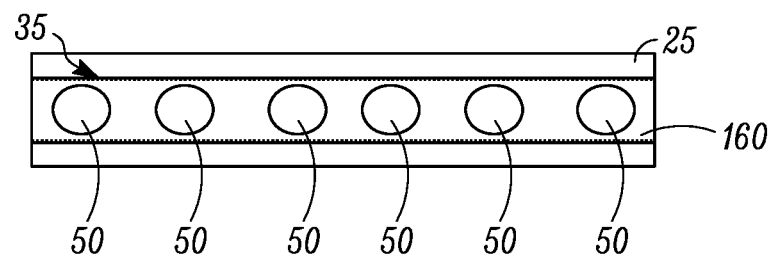
FIG. 8 is a top view of the frame member of the liquid crystal display device of FIG. 1, according to another embodiment.

FIG. 8 is a top view of the frame member 25 of the liquid crystal display device 10 of FIG. 1, according to another embodiment. The embodiment in FIG. 8 is an alternative to the embodiment shown and described regarding FIG. 7 above. In the embodiment of FIG. 8, the adhesives 50 are surrounded by the thermally conductive material 160.

In the illustrated embodiment, the thermally conductive material 160 can include a single layer of material instead of discretely portioned thermally conductive materials 160. It is to be appreciated that the embodiment of FIG. 7 could similarly include the adhesives 50 being surrounded by the thermally conductive material 160.

Figure 9:
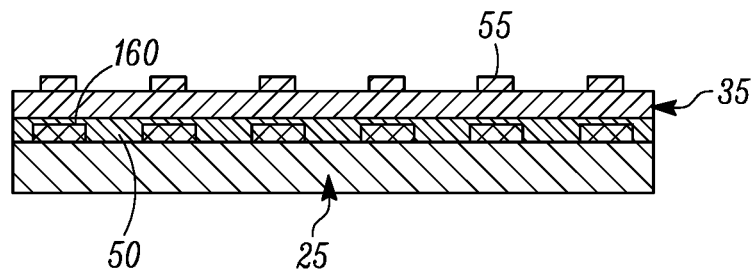
FIG. 9 is a cross-sectional view along line A-A of the portion of the frame member and the LED substrate of FIG. 3, according to another embodiment.

FIG. 9 is a cross-sectional view along line A-A of the portion 40 of the frame member 25 and the LED substrate 35 of FIG. 3, according to another embodiment.

The embodiment of FIG. 9 varies from the previously described embodiments by including an adhesive sheet having a plurality of openings therein. As a result, a plurality of adhesives 50 is visible when viewed in a sectional view. In the illustrated embodiment, the plurality of thermally conductive materials 160 is inserted into the locations at which openings would otherwise be visible.

Figure 11:
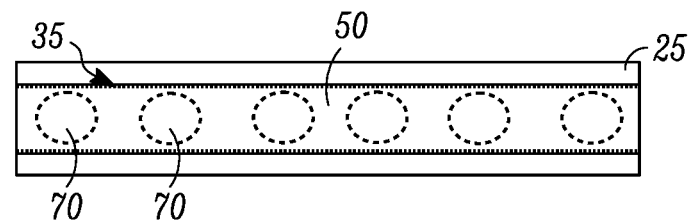
FIGS. 11 and 12 illustrate top views of the embodiment of FIG. 9, according to an embodiment.
Figure 12:
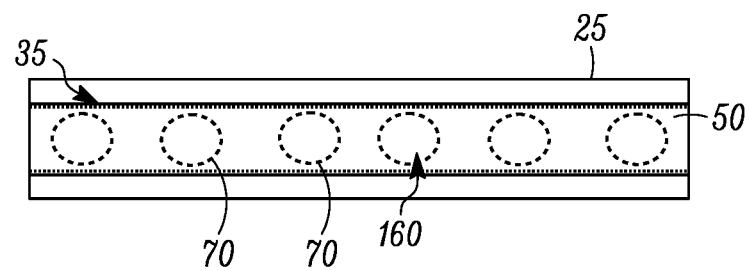

FIGS. 11 and 12 illustrate top views of the embodiment of FIG. 9. A plurality of openings 70 (FIGS. 11, 12) are formed in the adhesive 50. In the embodiment of FIG. 9, the openings 70 are filled with the thermally conductive materials 160. In the embodiment illustrated in FIG. 11, the openings 70 are not filled with a thermally conductive material 160. In FIGS. 11 and 12, the openings 70 are shown in dotted lines as they would not be visible in the top view.

Figure 10:
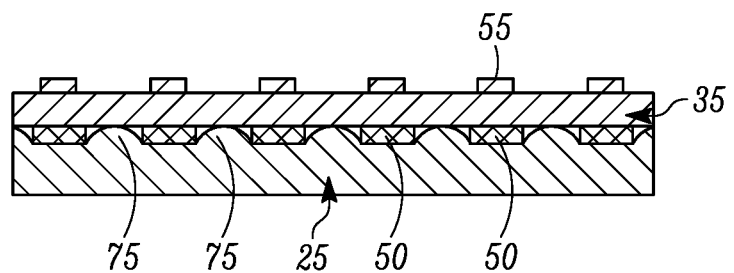
FIG. 10 is a cross-sectional view along line A-A of the portion of the frame member and the LED substrate of FIG. 3, according to another embodiment.

FIG. 10 is a cross-sectional view along line A-A of the portion 40 of the frame member 25 and the LED substrate 35 of FIG. 3, according to another embodiment. In the illustrated embodiment, the frame member 25 includes a modified surface portion to include protrusions 75. The protrusions 75 can be semicircular in shape (as illustrated). However, the geometry of the protrusions 75 is not limited to semicircular, but can vary within the principles described in this Specification. The protrusions 75 can provide a surface against which the LED substrate 35 contacts, especially when heated. Thus the protrusions 75 can provide a force preventing deformation of the LED substrate 35 toward the frame 25. Thermal conductive materials may be disposed in the space between the protrusions 75 and the LED substrate 35.

ASPECTS

Any of aspects 1-10 is combinable with any of aspects 11-20.

Aspect 1. A backlight for a display device, comprising: a light guide plate; a light emitting diode substrate, including: a substrate; and a plurality of light emitting diodes fixed to the substrate, the plurality of light emitting diodes being oriented to face a side surface of the light guide plate; a frame member disposed facing a surface of the substrate that is opposite the plurality of light emitting diodes; and in a side sectional view, a plurality of adhesive materials are spaced apart from each other along a length direction of the frame member, the length direction corresponding to a major dimension of the frame member.

Aspect 2. The backlight of aspect 1, further comprising a thermally conductive material disposed between the substrate and the frame member.

Aspect 3. The backlight of aspect 2, wherein a thermal conductivity of the thermally conductive material is relatively larger than a thermal conductivity of the plurality of adhesive materials.

Aspect 4. The backlight of any of aspects 1-3, wherein the frame member includes a plurality of protrusions extending toward the light emitting diode substrate, and in the side sectional view, each of the plurality of adhesive materials is disposed in a location between the plurality of protrusions.

Aspect 5. The backlight of any of aspects 1-4, wherein the adhesive material is formed of a single sheet having a plurality of openings spaced along a length direction of the single sheet.

Aspect 6. The backlight of aspect 5, further comprising a thermally conductive material disposed in one or more of the plurality of openings.

Aspect 7. The backlight of aspect 5, wherein the plurality of openings each include a geometry that is one of square, rectangular, circular, and elliptical.

Aspect 8. The backlight of any of aspects 1-7, wherein in a plan view the plurality of adhesive materials spaced apart from each other along the length direction of the frame member.

Aspect 9. The backlight of aspect 8, wherein each of the plurality of adhesive materials includes a geometry that is one of square, rectangular, circular, and elliptical.

Aspect 10. The backlight of any of aspects 1-9, further comprising a thermally conductive material disposed between the substrate and the frame member, wherein the thermally conductive material is disposed between the plurality of adhesive materials and the frame member.

Aspect 11. A display device, comprising: a liquid crystal display panel; and a backlight, the backlight including: a light guide plate; a light emitting diode substrate, including: a substrate; and a plurality of light emitting diodes fixed to the substrate, the plurality of light emitting diodes being oriented to face a side surface of the light guide plate; a frame member disposed facing a surface of the substrate that is opposite the plurality of light emitting diodes; and in a side sectional view, a plurality of adhesive materials are spaced apart from each other along a length direction of the frame member, the length direction corresponding to a major dimension of the frame member.

Aspect 12. The display device of aspect 11, further comprising a thermally conductive material disposed between the substrate and the frame member.

Aspect 13. The display device of aspect 12, wherein a thermal conductivity of the thermally conductive material is relatively larger than a thermal conductivity of the plurality of adhesive materials.

Aspect 14. The display device of any of aspects 11-13, wherein the frame member includes a plurality of protrusions extending toward the light emitting diode substrate, and in the side sectional view, each of the plurality of adhesive materials is disposed in a location between the plurality of protrusions.

Aspect 15. The display device of any of aspects 11-14, wherein the plurality of adhesive materials are formed of a single sheet having a plurality of openings spaced along a length of the single sheet.

Aspect 16. The display device of aspect 15, further comprising a thermally conductive material disposed in one or more of the plurality of openings.

Aspect 17. The display device of aspect 15, wherein the plurality of openings each include a geometry that is one of square, rectangular, circular, and elliptical.

Aspect 18. The display device of any of aspects 11-17, wherein in a plan view, the plurality of adhesive materials are spaced apart from each other along the length direction of the frame member.

Aspect 19. The display device of aspect 18, wherein each of the plurality of adhesive materials includes a geometry that is one of square, rectangular, circular, and elliptical.

Aspect 20. The display device of any of aspects 11-19, further comprising a thermally conductive material disposed between the substrate and the frame member, wherein the thermally conductive material is disposed between the plurality of adhesive materials and the frame member.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A backlight for a display device, comprising:
a light guide plate;
a light emitting diode substrate, including:
    a substrate; and
    a plurality of light emitting diodes fixed to the substrate, the plurality of light emitting diodes being oriented to face a side surface of the light guide plate;
a frame member disposed facing a surface of the substrate that is opposite the plurality of light emitting diodes;
in a side sectional view, a plurality of adhesive materials spaced apart from each other along a length direction of the frame member, the length direction corresponding to a major dimension of the frame member; and
a thermally conductive material disposed between the substrate and the frame member,
wherein a thermal conductivity of the thermally conductive material is relatively larger than a thermal conductivity of the plurality of adhesive materials.

2. The backlight of claim 1, wherein the frame member includes a plurality of protrusions extending toward the light emitting diode substrate, and in the side sectional view, each of the plurality of adhesive materials is disposed in a location between the plurality of protrusions.

3. The backlight of claim 1, wherein the adhesive material is formed of a single sheet having a plurality of openings spaced along a length direction of the single sheet.

4. The backlight of claim 3, wherein the thermally conductive material is disposed in one or more of the plurality of openings.

5. The backlight of claim 3, wherein the plurality of openings each include a geometry that is one of square, rectangular, circular, and elliptical.

6. The backlight of claim 1, wherein in a plan view the plurality of adhesive materials are spaced apart from each other along the length direction of the frame member.

7. The backlight of claim 6, wherein each of the plurality of adhesive materials includes a geometry that is one of square, rectangular, circular, and elliptical.

8. The backlight of claim 1, wherein the thermally conductive material is disposed between the plurality of adhesive materials and the frame member.

9. A display device, comprising:
a liquid crystal display panel; and
a backlight, the backlight including:
    a light guide plate;
    a light emitting diode substrate, including:
        a substrate; and
        a plurality of light emitting diodes fixed to the substrate, the plurality of light emitting diodes being oriented to face a side surface of the light guide plate;
    a frame member disposed facing a surface of the substrate that is opposite the plurality of light emitting diodes,
    in a side sectional view, a plurality of adhesive materials spaced apart from each other along a length direction of the frame member, the length direction corresponding to a major dimension of the frame member; and
    a thermally conductive material disposed between the substrate and the frame member,
    wherein a thermal conductivity of the thermally conductive material is relatively larger than a thermal conductivity of the plurality of adhesive materials.

10. The display device of claim 9, wherein the frame member includes a plurality of protrusions extending toward the light emitting diode substrate, and in the side sectional view, each of the plurality of adhesive materials is disposed in a location between the plurality of protrusions.

11. The display device of claim 9, wherein the plurality of adhesive materials are formed of a single sheet having a plurality of openings spaced along a length of the single sheet.

12. The display device of claim 11, wherein the thermally conductive material is disposed in one or more of the plurality of openings.

13. The display device of claim 11, wherein the plurality of openings each include a geometry that is one of square, rectangular, circular, and elliptical.

14. The display device of claim 9, wherein in a plan view, the plurality of adhesive materials are spaced apart from each other along the length direction of the frame member.

15. The display device of claim 14, wherein each of the plurality of adhesive materials includes a geometry that is one of square, rectangular, circular, and elliptical.

16. The display device of claim 9, wherein the thermally conductive material is disposed between the plurality of adhesive materials and the frame member.

17. A backlight for a display device, comprising:
a light guide plate;
a light emitting diode substrate, including:
    a substrate; and
    a plurality of light emitting diodes fixed to the substrate, the plurality of light emitting diodes being oriented to face a side surface of the light guide plate;
a frame member disposed facing a surface of the substrate that is opposite the plurality of light emitting diodes, and
in a side sectional view, a plurality of adhesive materials being spaced apart from each other along a length direction of the frame member, the length direction corresponding to a major dimension of the frame member,
wherein the frame member includes a plurality of protrusions extending toward the light emitting diode substrate, and in the side sectional view, each of the plurality of adhesive materials is disposed in a location between the plurality of protrusions.

* * * * *